US011097474B2

(12) United States Patent
Migliori et al.

(10) Patent No.: US 11,097,474 B2
(45) Date of Patent: Aug. 24, 2021

(54) EXTRUSION TIP INSERT FOR USE IN ADDITIVE MANUFACTURING SYSTEM

(71) Applicant: Stratasys, Inc., Eden Prairie, MN (US)

(72) Inventors: Bryan Migliori, Lakeville, MN (US); Shawn Michael Koop, Blaine, MN (US); James Flannigan, Roseville, MN (US)

(73) Assignee: Stratasys, Inc., Eden Prairie, MN (US)

( * ) Notice: Subject to any disclaimer, the term of this patent is extended or adjusted under 35 U.S.C. 154(b) by 215 days.

(21) Appl. No.: 16/126,887

(22) Filed: Sep. 10, 2018

(65) Prior Publication Data

US 2020/0079014 A1 Mar. 12, 2020

(51) Int. Cl.
*B29C 64/209* (2017.01)
*B33Y 30/00* (2015.01)
*B29C 64/118* (2017.01)
*B29C 64/295* (2017.01)
*B33Y 10/00* (2015.01)

(52) U.S. Cl.
CPC .......... *B29C 64/209* (2017.08); *B29C 64/118* (2017.08); *B29C 64/295* (2017.08); *B33Y 10/00* (2014.12); *B33Y 30/00* (2014.12)

(58) Field of Classification Search
CPC ... B29C 64/118; B29C 64/209; B29C 64/295; B33Y 10/00; B33Y 30/00
See application file for complete search history.

(56) References Cited

U.S. PATENT DOCUMENTS

| 4,678,423 | A | * | 7/1987 | Bertolotti | ............ B29C 48/3003 425/311 |
|---|---|---|---|---|---|
| 5,503,785 | A | | 4/1996 | Crump et al. | |
| 6,004,124 | A | * | 12/1999 | Swanson | ................ B29C 48/05 425/375 |
| 6,054,077 | A | | 4/2000 | Comb et al. | |
| 6,547,995 | B1 | | 4/2003 | Comb | |
| 6,814,907 | B1 | | 11/2004 | Comb | |
| 7,384,255 | B2 | | 6/2008 | LaBossiere et al. | |
| 7,604,470 | B2 | | 10/2009 | LaBossiere et al. | |
| 7,625,200 | B2 | | 12/2009 | Leavitt | |

(Continued)

*Primary Examiner* — Xiao S Zhao
*Assistant Examiner* — Joseph S Leyson
(74) *Attorney, Agent, or Firm* — Peter J. Ims; Westman, Champlin & Koehler, P.A.

(57) ABSTRACT

A liquefier assembly for use in an extrusion-based additive manufacturing system includes a liquefier tube compositionally comprising a metallic material, and having a first end and a second end offset along a longitudinal axis, and a flow channel extending from the first end to the second end. The assembly further includes an extrusion tip compositionally comprising a metallic material and coupled to the second end of the liquefier tube, the extrusion tip having a cavity having an interior shoulder wherein the cavity terminates in an opening. The liquefier includes a hardened insert compositionally comprising a material that is harder than the metallic material of the extrusion tip and the metallic material of the liquefier tube. The hardened insert has an exterior shoulder that engages the interior shoulder of the extrusion tip such that the insert is press fit within the extrusion tip. The tip insert has a channel that aligns with the flow channel wherein the channel terminates at an extrusion port configured to extrude material therefrom.

20 Claims, 7 Drawing Sheets

(56) References Cited

U.S. PATENT DOCUMENTS

| | | |
|---|---|---|
| 7,896,209 B2 | 3/2011 | Batchelder et al. |
| 8,153,182 B2 | 4/2012 | Comb et al. |
| 8,419,996 B2 | 4/2013 | Swanson et al. |
| 8,647,102 B2 | 2/2014 | Swanson et al. |
| 8,926,882 B2 | 1/2015 | Batchelder et al. |
| 10,259,160 B2 | 4/2019 | Mark |
| 2012/0070523 A1* | 3/2012 | Swanson ............. B29C 67/0085 425/96 |
| 2017/0232674 A1* | 8/2017 | Mark .................... B33Y 30/00 264/308 |
| 2018/0043627 A1 | 2/2018 | Barclay et al. |

\* cited by examiner

EXTRUSION TIP INSERT FOR USE IN ADDITIVE MANUFACTURING SYSTEM

BACKGROUND

The present disclosure relates to additive manufacturing systems for 3D printing three-dimensional parts by material extrusion techniques. In particular, the present disclosure relates to an extrusion nozzle with hardened wear surfaces configured to engage an abrasive polymeric feedstock. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

Whichever print system architecture is used, the printing operation for fused deposition modeling is dependent on extruding build materials at a predictable and targeted extrusion rate. There is an ongoing need for improved reliability in printing parts with high-performance materials, and in particular materials that include abrasive fillers, using extrusion-based additive manufacturing techniques.

SUMMARY

An aspect of the present disclosure includes a liquefier assembly for use in an extrusion-based additive manufacturing system. The liquefier assembly includes a liquefier tube compositionally comprising a metallic material, and having a first end and a second end offset along a longitudinal axis. The liquefier tube has a flow channel extending from the first end to the second end. The assembly further includes an extrusion tip compositionally comprising a metallic material and coupled to the second end of the liquefier tube, the extrusion tip having a cavity with an interior shoulder wherein the cavity terminates in an opening. The assembly includes a hardened insert compositionally comprising a material that is harder than the metallic material of the extrusion tip and the metallic material of the liquefier tube. The hardened insert has an exterior shoulder that engages the interior shoulder of the extrusion tip such that the insert is press fit within the extrusion tip. The tip insert has a channel that aligns with the flow channel wherein the channel terminates at an extrusion port configured to extrude material therefrom.

Another aspect of the present disclosure includes a print head for use in an extrusion-based additive manufacturing system. The print head includes a liquefier tube compositionally comprising a metallic material, and having a first end and a second end offset along a longitudinal axis. The liquefier tube has a flow channel extending from the first end to the second end. A heater positioned about the liquefier tube proximate the second end, where the heater configured to heat feedstock material to a molten state. An extrusion tip compositionally comprises a metallic material, where the extrusion tip is coupled to the second end of the liquefier tube. The extrusion tip has a cavity with an interior downwardly sloping shoulder wherein the cavity terminates in an opening. A hardened insert compositionally comprises a material that is harder than the metallic material of the extrusion tip and the metallic material of the liquefier tube. The hardened insert has an exterior surface that is complementary to surfaces defining the cavity of the extrusion tip. The exterior surface includes a downwardly sloped exterior shoulder that engages the interior downwardly sloped shoulder of the extrusion tip such that the insert is press fit within the extrusion tip. The extrusion tip insert has a channel that aligns with the flow channel wherein the channel terminates at an extrusion port configured to extrude material therefrom.

Another aspect of the present disclosure relates to a method of printing a part with an extrusion-based additive manufacturing system. The method includes providing a print head comprising a liquefier tube having an internal flow channel extending from a first end to a second end, an extrusion tip coupled to the second end of the liquefier tube and a tip insert located within the extrusion tip, the tip insert comprising surfaces that direct the flow of the molten feedstock through an extrusion port, wherein the tip insert is constructed of a second material that resists abrasion relative to a first material of the extrusion tip and the material of the liquefier tube. The method also includes feeding a feedstock into the first end of the liquefier tube and heating the feedstock in the liquefier tube proximate to the second end into a molten pool. The method includes extruding the molten feedstock through the extrusion port and depositing the molten feedstock from the extrusion tip along a series of roads to print a three-dimensional part.

DETAILED DESCRIPTION

The present disclosure is directed to an extruder with a hardened extrusion tip insert for use in 3D printing of parts using material extrusion techniques. Utilizing a hardened tip insert reduces tip wear to extend the life of the extruder when printing parts with polymeric materials loaded with abrasive fillers, such as but not limited to, carbon fiber and glass fiber.

The term "additive manufacturing system" refers to a system that prints, builds, or otherwise produces parts, prototypes, or other 3D items and/or support structures at least in part using an additive manufacturing technique. The additive manufacturing system may be a stand-alone 3D printer, a robotic system, a sub-unit of a larger system or production line, and/or may include other non-additive manufacturing features, such as subtractive-manufacturing features, pick-and-place features, two-dimensional printing features, and the like.

The filled feedstock may include a polymeric matrix that may be filled with particles, such as carbon fiber or glass fiber, where the polymeric feedstock melts when using semi-crystalline polymeric materials or becomes sufficiently flowable when using amorphous polymeric materials to print the part by extrusion of the material along toolpaths.

Standard extrusion tips are typically constructed of a metal material, such as stainless steel, which withstands the printing of parts with unfilled polymeric materials. However, a polymeric feedstock material loaded with abrasive fibers causes erosion of stainless steel and similar metals over a relatively short amount of time to cause inaccurate extrusion of the part, and therefore requires frequent replacement of the extrusion tip, liquefier, or print head. By way of example, when a filament is loaded with carbon fiber, a stainless steel extrusion tip may encounter excessive wear on both an internal inner surface and an external surface, and last for approximately 200 cubic inches of printing.

A tip with hardened surfaces reduces wear caused by erosion. Hardened substances may provide abrasion resistance but can be challenging to machine, costly, and difficult to fasten to parts formed of other materials. One example of a hardened material which may be used to form the extrusion tip is tungsten carbide, also known as "carbide." Carbide is approximately twice as strong as steel and may be pressed and formed into various shapes. However, carbide is more expensive than stainless steel and it may be cost prohibitive to make a liquefier assembly of carbide. Further, carbide can be difficult to fasten to other materials.

Thus, the present disclosure overcomes the challenges of tip wear by presenting an extrusion tip insert that is configured to be press fit within a liquefier to reduce wear on the extrusion tip caused by loaded polymeric feedstocks. However, prior to providing additional details regarding the different embodiments, a description of an illustrative operating environment is provided below.

Figure 1:
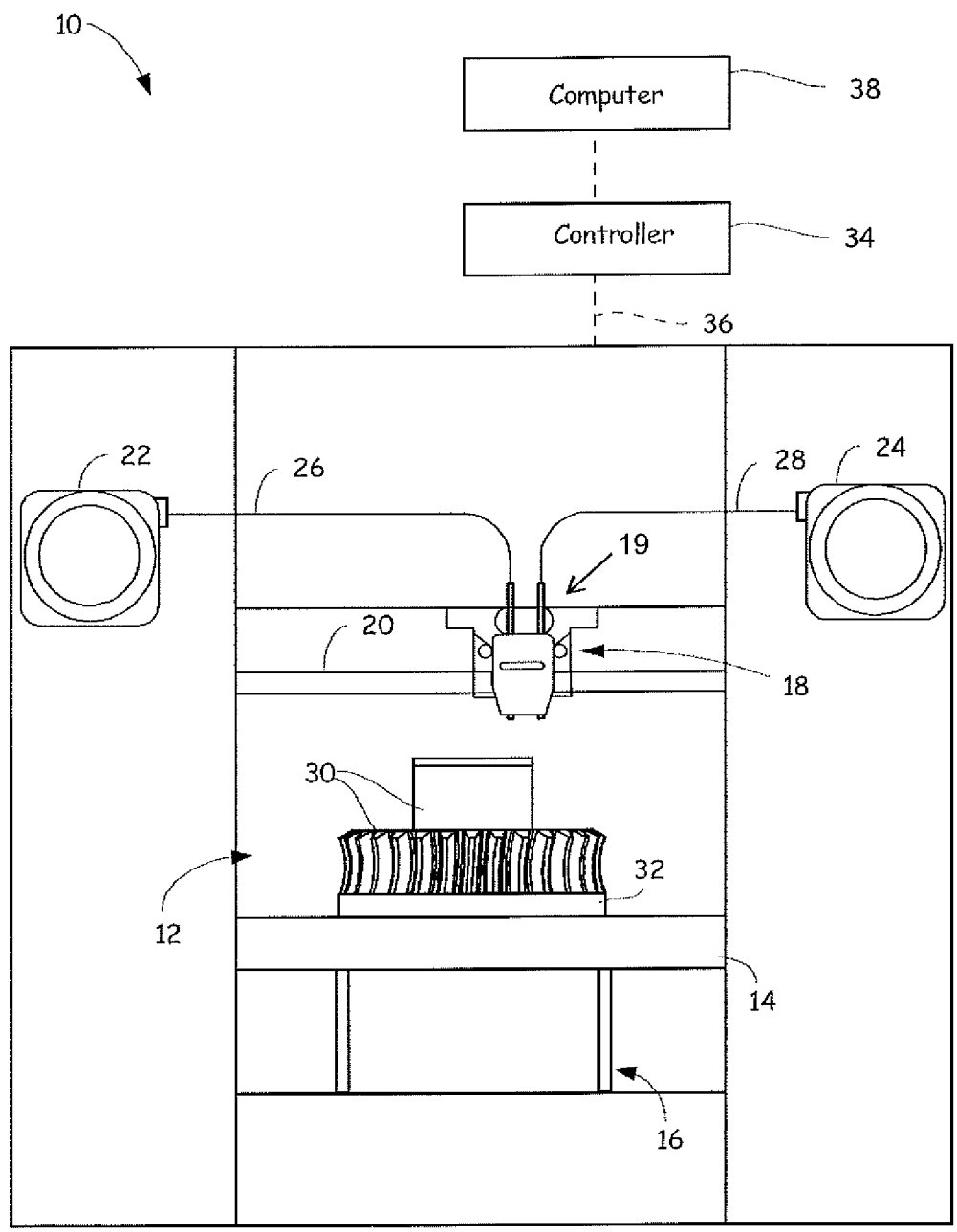
FIG. 1 is a front view of an exemplary additive manufacturing system configured to print 3D parts utilizing an extrusion tip insert.

FIG. 1 is a schematic front view of an exemplary additive manufacturing system 10 which may use an extrusion tip insert according to an embodiment of the present disclosure. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, an extrusion head or print head 18, head gantry 20, and consumable assemblies 22 and 24. Chamber 12 is an enclosed environment that contains platen 14 and any printed parts. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more drive mechanisms, such as drive mechanism 19, are directed to intermittently feed the modeling and support materials (e.g., consumable filaments via feed tube assemblies 26 and 28) through print head 18 from supply sources 22 and 24.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 10 and/or controller 34 can also communicate with computer 38, which can include one or more discrete computer-based systems that communicate with system 10 and/or controller 34, and may be separate from system 10, or alternatively may be an internal component of system 10. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part material is deposited in layers along toolpaths that build upon one another to form the 3D part 30.

Figure 2:
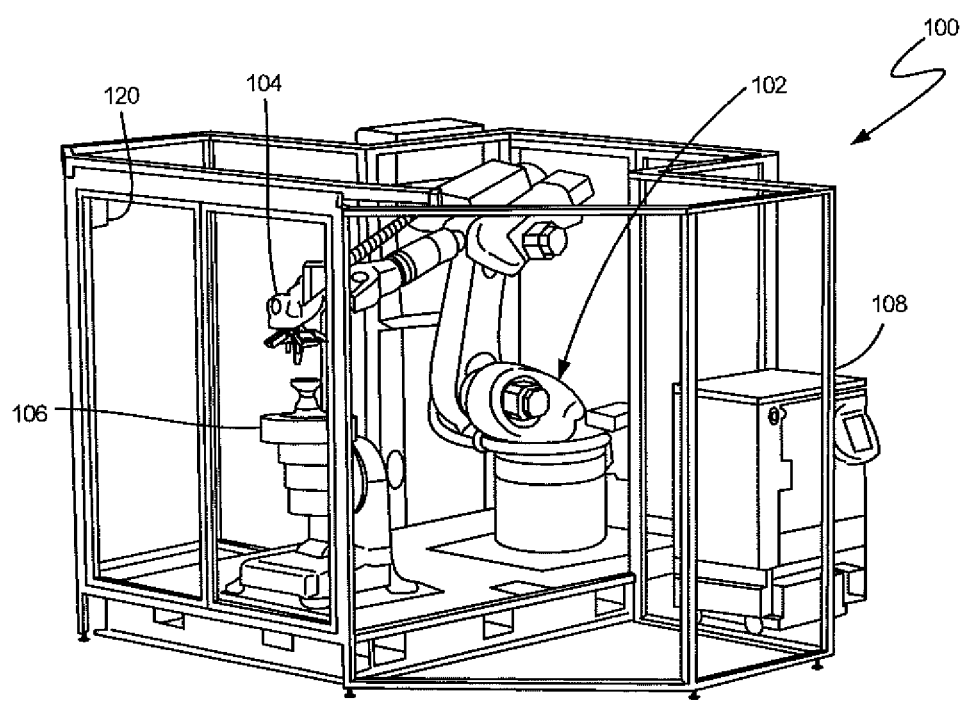
FIG. 2 is a schematic view of exemplary robotic additive manufacturing system configured to print 3D parts utilizing an extrusion tip insert.

FIG. 2 is a perspective view of a multi-axis robotic build system 100 that may be used for building 3D parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as, by way of example only and not by way of limitation, a print head similar to print head 18 described above, for printing parts from a filament feedstock. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104. The system 100 optionally may be housed within a build structure 120.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

A print head used with a fused deposition additive manufacturing system such as the embodiment of system 10 or 100 typically utilizes a liquefier assembly comprising a liquefier comprised of a liquefier tube and an extrusion tip, such as is disclosed in Swanson et al. U.S. Pat. No. 6,004,124. A heater such as a heating block or a heating coil is positioned about the liquefier tube along a length extending from proximate the outlet end to a location offset from the inlet end. The heater creates a melt zone region within a lower longitudinal region of the liquefier where a filament feedstock is heated and melted to form a melt pool. As filament feedstock is driven into the inlet end of the liquefier, molten material from the melt pool is extruded through an outlet of the extrusion tip at the outlet end. The liquefier tube is typically cylindrical for receiving round filament feedstocks, but may alternatively may have a rectangular or other cross-sectional geometry configured to receive a ribbon filament or other geometries of feedstock.

Figure 3A:
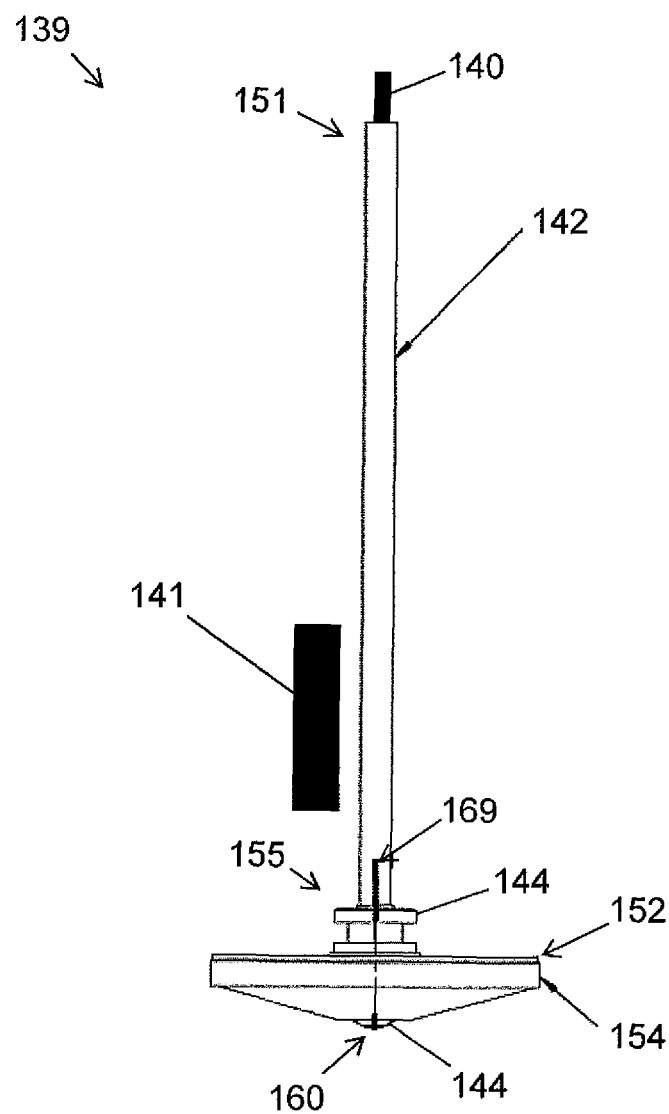
FIG. 3A is a side sectional view of an exemplary liquefier assembly which may be configured to print 3D parts utilizing an extrusion tip insert.
Figure 3B:
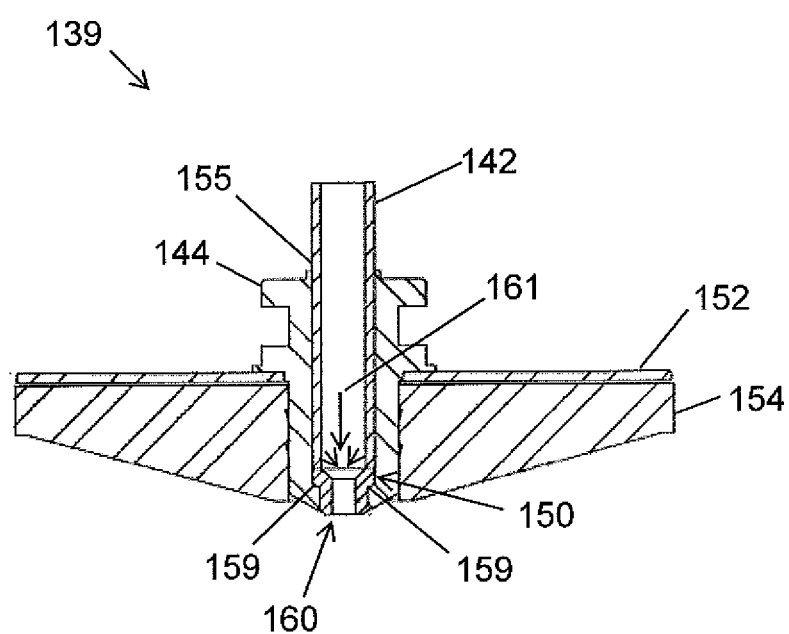
FIG. 3B is a cross-sectional view of the exemplary liquefier assembly of FIG. 3A.

FIGS. 3A and 3B illustrate an exemplary liquefier assembly 139 of the present disclosure, which includes a hardened tip insert suitable for printing abrasive materials. Liquefier assembly 139 is suitable for use in a print head, such as print head 18, of an extrusion-based additive manufacturing system, such as system 10 of FIG. 1 or system 100 of FIG. 2. Liquefier assembly 139 includes a liquefier tube 142 having a first end 151 and a second end 155 offset along a longitudinal axis, and a flow channel 169 therethrough. The liquefier tube 142 compositionally comprises a metallic material such as stainless steel, and may accept a filament 140 at the first end 151. An extrusion tip 144 is coupled to the second end 155 of liquefier tube 142, and has an internal cavity 150 defined by downwardly sloped surfaces 159 configured to receive a tip insert 160. Extrusion tip 144 may be secured to liquefier tube 142 at second end 155 in a variety of manners, including welding, and may be fabricated from one or more materials configured to withstand the thermal environment of a build chamber and print head without thermal degradation for a suitable operational life, such as one or more metallic materials (e.g., stainless steel). Liquefier assembly 139 may further include a plate 152 and a tip shield 154 positioned about the extrusion tip 144. Tip insert 160 (described in more detail below) is inserted within extrusion tip 144 abutting the second end 155 of liquefier tube 142 to function as an extrusion nozzle, and is maintained in place without the use of fasteners.

A heater 141 or other heating component is positioned proximate to a lower longitudinal region of liquefier assembly 139 (e.g., proximate to second end 155) to heat the feedstock or filament 140 into a molten pool within liquefier tube 142. It should be noted that the polymeric feedstock may comprise thermoplastic filament material and can consist of either amorphous or semi-crystalline thermoplastic blends. Thus, pool refers generally to the flowable state of feedstock 140 and is not limited to specific mechanical, thermal, or chemical properties of the polymer being used.

FIG. 3B illustrates a cross sectional view of liquefier assembly 139. As can be seen in FIG. 3A, feedstock 140 is heated to form a molten pool in a zone proximate to second end 155. In FIG. 3B, downward pressure from feedstock 140 forces the pool to flow downward along direction arrows 161. The molten pool flows through liquefier tube 139 along flow channel 169 where the flow is constricted and may be directed by insert 160 to exit extrusion tip 139.

Figure 4A:
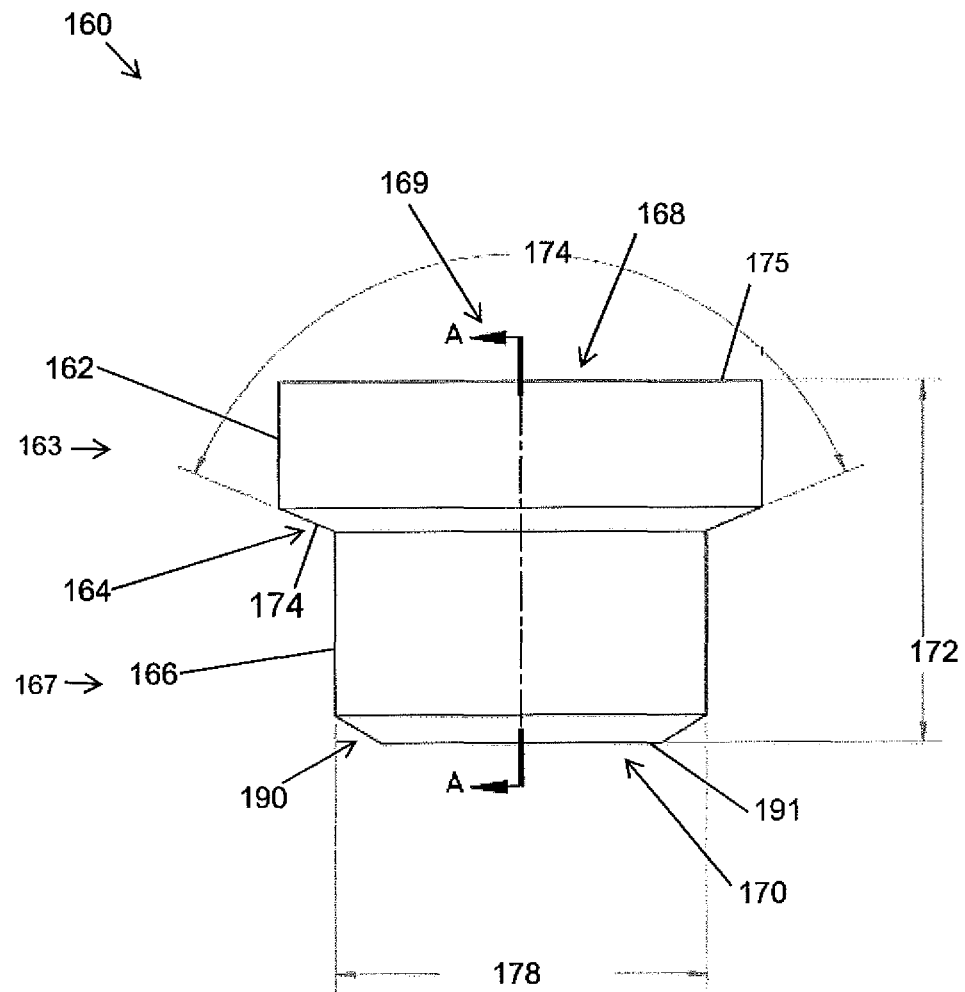
FIG. 4A is a side external view of an extrusion tip insert according to an embodiment of the present disclosure.
Figure 4B:
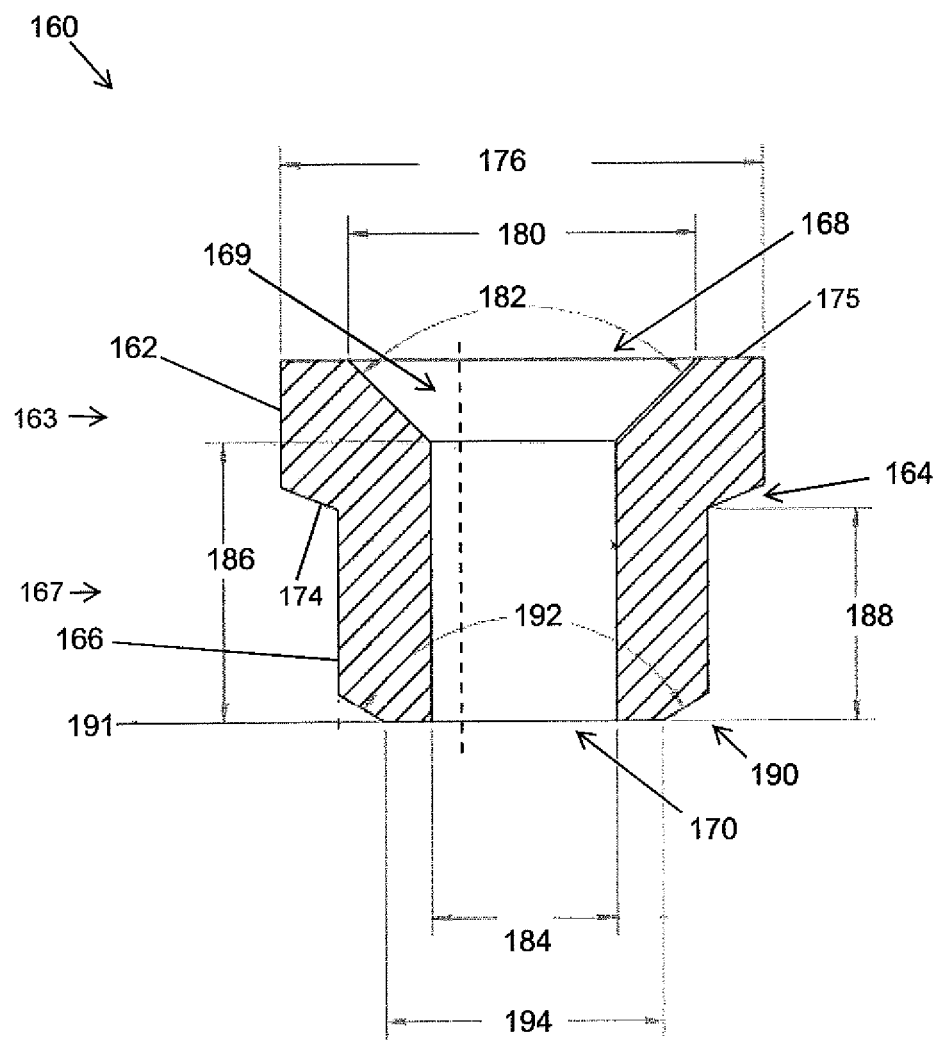
FIG. 4B is a sectional view of the extrusion tip insert of FIG. 4A.

FIGS. 4A and 4B are a perspective view of an exemplary hardened tip insert 160 configured to be press fit within extrusion tip 144. The tip insert is constructed of a material such as carbide that resists abrasion relative to the metal material of the extrusion tip and the liquefier tube. Carbide is a non-limiting example of hardened materials that may be used for the tip insert 160. However, the material need not be so limited, and one skilled in the art will recognize that various materials that resist abrasion may be used to provide surfaces for extruding an abrasive molten feedstock through an extrusion outlet.

Tip insert 160 includes a wider upper portion 163, a narrower lower portion 167, and an angled shoulder 164 therebetween. Tip insert 160 further includes a top surface 175 having an inlet 168 configured to abut the outlet end of liquefier tube 142 and receive a flow of molten material from the liquefier flow channel 169, and a bottom surface 191 having an extrusion outlet 170, wherein the bottom surface 191 is external to the extrusion tip to provide a tip face for the liquefier assembly 139. Channel 169 extends through tip insert 160 to allow extrusion of feedstock material through the extrusion outlet 170.

Exterior surfaces of the tip insert 160 complement contours of internal surfaces 159 of extrusion tip 144, such that tip insert 160 may be press fit into the internal cavity 150 of extrusion tip 144. The exterior surfaces of tip insert 160 include an upper surface 162 of upper portion 163, and a lower surface 166 of lower portion 167, and an angled surface 174 of shoulder 164. Interior surfaces of channel 169 are configured to convey and accelerate a flow of molten material (e.g., molten pool) from inlet 168 through the narrower passageway of extrusion outlet 170.

Shoulder 164 of tip insert 160 is configured to press against a correspondingly shaped inner surface of the extrusion tip 144, such as at an angle that may be about 45 degrees relative to the channel 169. Upper portion 163 has an outer width or outer diameter 176 and lower section 167 has an outer width or outer diameter 178, such that diameter 176 is greater than diameter 178. The shape of the tip insert 160 and the extrusion tip cavity 150 are such that tip insert 160 may be securely retained within the extrusion tip 144 during use without fasteners.

FIG. 4B is a sectional view of tip insert 160. Channel 169 has a frusto-conical configuration in upper portion 163 which directs a flow along direction arrows 161 of FIG. 3B. Channel 169 has an inner diameter 180 at inlet 168 and narrows by an angle 182 to a channel diameter 184. Channel 169 then passes through lower portion 167 with a substantially consistent diameter 184 to extrusion outlet 170. The frusto-conical passageway in upper portion 163 may extend internally to a height 186 and lower portion 167 may include a height 188 extending from shoulder 164 to extrusion outlet 170. Thus, the internal surfaces of tip insert 160 (e.g., surfaces of channel 169) are configured to direct the flow of molten filament from the inlet 168 through the extrusion outlet 170.

In one embodiment, tip insert 160 may further include a sloped edge 190 which surrounds extrusion outlet 170 on bottom surface 191. In the shown embodiment, bottom surface 191 angles upwards at edges thereof at an angle 192, providing a flat tip face having diameter 194. Non-limiting and exemplary measurements are an outer diameter 194 of 0.6 inches, and angle 192 of 118 degrees.

Tip insert 160 in FIGS. 4A and 4B are exemplary illustrations of an extrusion tip insert which may be placed within an extrusion tip, such as extrusion tip 144, in a liquefier assembly. Tip insert 160 is configured to be inserted in an extrusion tip and press fitted within the extrusion tip without using additional fastening means, such as by a weld, braze, glue, or other fastening. The angled shoulder of the tip insert is configured to engage with a complementary inner surface of the extrusion tip such that the tip insert is secured within the liquefier assembly when the extrusion tip is coupled to the liquefier tube. The flow of feedstock material through the liquefier assembly causes downward pressure on the insert that results in the tip insert pressing into a sealed configuration with the extrusion tip.

The tip insert 160, liquefier tube 142, and extrusion tip 144 may be comprised of materials with similar thermal expansion coefficients (TEC s) to facilitate tip insert 160 remaining in a sealed configuration during thermal cycling. For example, carbides have TECs of approximately 4.3-7.5 ppm/° C., while stainless steels have TECs of approximately 6.5-10.4 ppm/° C. If the components comprise sufficiently different TECs, the tip insert may tend to move from the extrusion tip as the temperature fluctuates and the sealing engagement therebetween could be broken. In one embodiment, the extrusion tip 144 and the tip insert 160 have TECs matched within 10% of each other to reduce movement between the tip insert and the extrusion tip during thermal cycling.

As an alternative to tip insert 160, surfaces 159 of the cavity 150 within extrusion tip 144 may be constructed of a hardened material using various techniques. Non-limiting examples include chemically or electrically coating or plating the hardened material onto the cavity 150. Surfaces 159 may provide a surface layer of the hardened material with sufficient layer thickness to resist wear from an abrasive molten feedstock. One example of a minimal surface 159 thickness is 10 μm. However, one skilled in the art will recognize that the hardened material may comprise various materials with different abrasive resistant properties and therefore surface 159 may comprise surface layers with various thicknesses without departing from the scope of the disclosure.

Figure 5:
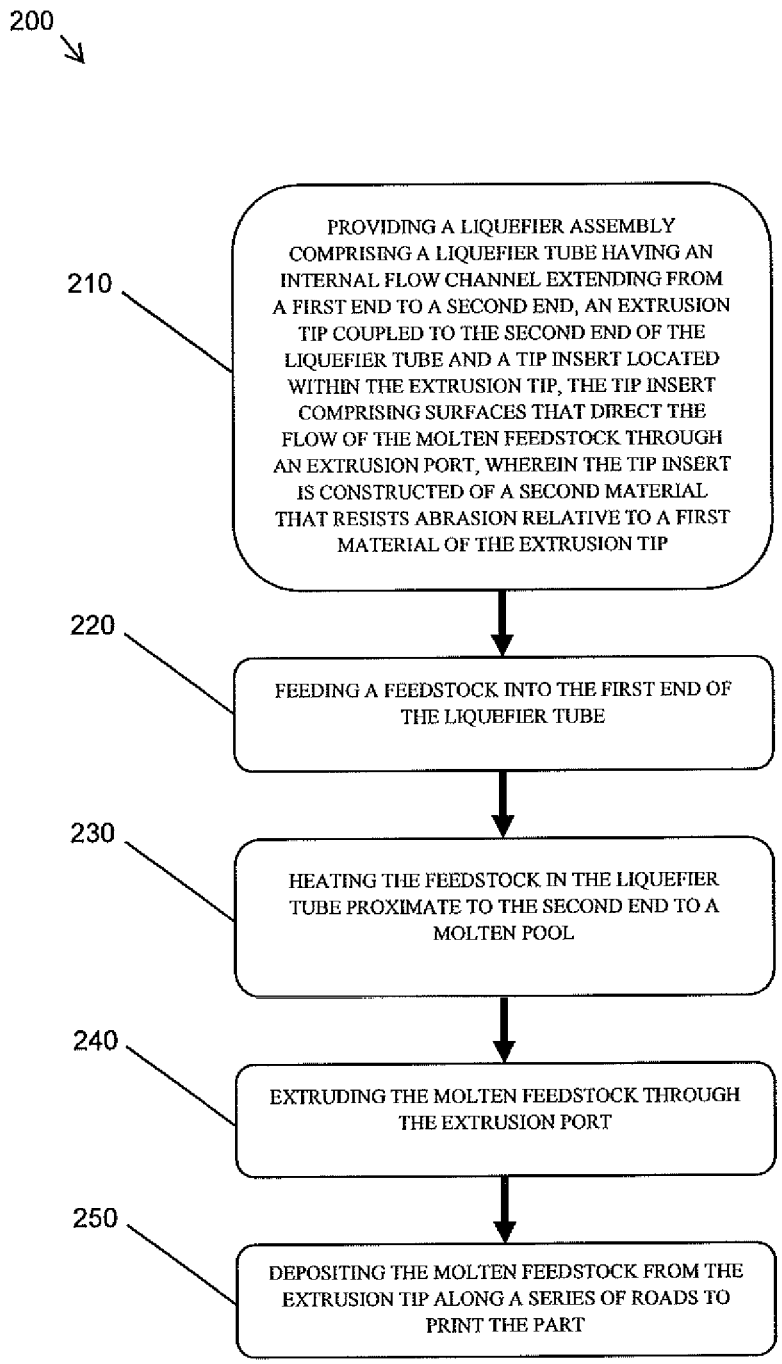
FIG. 5 is a flow diagram illustrating a method embodiment of the present disclosure.

FIG. 5 is a flow chart illustrating a method 200 for printing a 3D part with an additive manufacturing system. Method 200 includes providing 210 providing a liquefier assembly comprising a liquefier tube having an internal flow channel extending from a first end to a second end, an extrusion tip coupled to the second end of the liquefier tube and a tip insert located within the extrusion tip, the tip insert comprising surfaces that direct the flow of the molten feedstock through an extrusion port, wherein the tip insert is constructed of a second material that resists abrasion relative to a first material of the extrusion tip. The method 200 also includes feeding 220 a feedstock into the first end of the liquefier tube and heating 230 the feedstock in the liquefier tube proximate to the second end to a molten pool. Finally, the method 200 provides extruding 240 the molten feedstock through the extrusion port and depositing 250 the molten feedstock from the extrusion tip along a series of roads to print the part.

Although the present disclosure may have been described with reference to preferred embodiments, workers skilled in the art will recognize that changes may be made in form and detail without departing from the spirit and scope of the disclosure.

The invention claimed is:

1. A liquefier assembly for use in an extrusion-based additive manufacturing system, the liquefier assembly comprising:
    a liquefier tube compositionally comprising a metallic material, and having a first end and a second end offset along a longitudinal axis, and a flow channel with a substantially constant cross-sectional area extending from the first end to the second end;
    a static extrusion tip having a top end and a bottom end, the extrusion tip compositionally comprising a metallic material, the extrusion tip having a cavity from the top end to the bottom end, the cavity having a first cross-sectional area from the top end to an interior shoulder and a second cross-sectional area from the interior shoulder to an opening, wherein the first cross-sectional area is greater than the second cross-sectional area; and
    a hardened insert having an inlet end and an outlet end, the hardened insert compositionally comprising a material that is harder than the metallic material of the static extrusion tip and the metallic material of the liquefier tube, the hardened insert having an outer surface with a complementary configuration to that of the cavity from the opening to a distance above the shoulder and below the top end, the outer surface having an exterior shoulder that engages the interior shoulder of the extrusion tip such that the insert is positioned into the cavity from the top end of the static extrusion tip and press fit within the extrusion tip, the insert having an insert channel from the inlet end to the outlet end, wherein the insert channel at the inlet end aligns with the flow channel at the second end of the liquefier tube when the second end is positioned into the cavity of the static extrusion tip through the top end such that the second end of the liquefier tube abuts the inlet end of the hardened insert and wherein the insert channel terminates at an extrusion port at the outlet end, wherein the extrusion port is configured to extrude material therefrom.

2. The assembly of claim 1, wherein the interior shoulder and the exterior shoulder are downwardly sloped.

3. The assembly of claim 1, wherein the interior shoulder and the exterior shoulder are downwardly sloped at an angle of about 45 degrees.

4. The assembly of claim 1, wherein the hardened insert is compositionally carbide.

5. The assembly of claim 1, wherein the channel in the insert is at least partially defined by downwardly sloped surfaces that terminate in the extrusion port.

6. The assembly of claim 1, and further comprising a tip shield attached to the extrusion tip wherein the tip shield is positioned about the extrusion port.

7. The assembly of claim 1, and further comprising a filament drive located above the first end of the liquefier tube, wherein the filament drive is configured to drive a filament feedstock into the flow channel of the liquefier tube.

8. The assembly of claim 1, and further comprising a heating element positioned about the liquefier tube proximate the second end, wherein the heating element is configured to heat a feedstock to a molten state.

9. The assembly of claim 1, wherein the extrusion tip is welded to the liquefier tube proximate the second end.

10. The assembly of claim 1, wherein the liquefier tube has a substantially circular cross-section.

11. The assembly of claim 1, wherein the liquefier tube has a substantially rectangular cross-section.

12. A print head for use in an extrusion-based additive manufacturing system, the print head comprising a liquefier assembly comprising:
    a liquefier tube compositionally comprising a metallic material, and having a first end and a second end offset along a longitudinal axis, and a flow channel having a substantially constant cross-sectional area extending from the first end to the second end;
    a heater positioned about the liquefier tube proximate the second end, the heater configured to heat feedstock material to a molten state;
    an extrusion tip having a top end and a bottom end, the extrusion tip compositionally comprising a metallic material and coupled to the second end of the liquefier tube, the extrusion tip having a cavity from the top end to the bottom end, the cavity having a first cross-sectional area from the top end to an interior downwardly sloping shoulder and a second cross-sectional area from the interior shoulder to an opening, wherein the first cross-sectional area is greater than the second cross-sectional area; and
    a hardened insert having an inlet end and an outlet end, the hardened insert compositionally comprising a material that is harder than the metallic material of the extrusion tip and the metallic material of the liquefier tube, the hardened insert having an exterior surface that is complementary to surfaces defining the cavity of the extrusion tip, wherein the exterior surface includes a downwardly sloped exterior shoulder that engages the interior downwardly sloped shoulder of the extrusion tip when the hardened insert is positioned into the cavity from the top end such that the insert is press fit within the extrusion tip, the insert having an insert channel from the inlet end to the outlet end, wherein the insert channel aligns with the flow channel when the second end is positioned into the cavity of the extrusion tip through the top end such that the second end of the liquefier tube abuts the inlet end of the hardened insert, wherein the insert channel terminates at an extrusion port configured to extrude material therefrom.

13. The print head of claim 12, wherein the interior shoulder and the exterior shoulder are downwardly sloped at an angle of about 45 degrees.

14. The print head of claim 12, wherein the hardened insert is compositionally carbide.

15. The print head of claim 12, wherein the channel in the insert is at least partially defined by downwardly sloped surfaces that terminate in the extrusion port.

16. The print head of claim 12, and further comprising a tip shield attached to the extrusion tip wherein the tip shield is positioned about the extrusion port.

17. The print head of claim 12, and further comprising a filament drive located above the first end of the liquefier tube, wherein the filament drive is configured to drive a filament feedstock into the flow channel of the liquefier tube.

18. The print head of claim 12, wherein the extrusion tip is welded to the liquefier tube proximate the second end.

19. A method of printing a part with an extrusion-based additive manufacturing system, the method comprising:
   providing a liquefier assembly comprising a liquefier tube compositionally comprising a metallic material and having an internal flow channel with a substantially constant cross-sectional area extending from a first end to a second end, an extrusion tip having a top end and a bottom end, the extrusion tip compositionally comprising a metallic material and coupled to the second end of the liquefier tube, the extrusion tip having a cavity from the top end to the bottom end, the cavity having a first cross-sectional area from the top end to an interior downwardly sloping shoulder and a second cross-sectional area from the interior shoulder to an opening, wherein the first cross-sectional area is greater than the second cross-sectional area, and a tip insert positioned within the cavity of the extrusion tip from the top end, the tip insert having an inlet end and an outlet end, the insert compositionally comprising a material that is harder than the metallic material of the extrusion tip and the metallic material of the liquefier tube, the insert having an exterior surface that is complementary to surfaces defining the cavity of the extrusion tip, wherein the exterior surface includes a downwardly sloped exterior shoulder that engages the interior downwardly sloping shoulder of the extrusion tip when the insert is positioned into the cavity from the top end such that the insert is press fit within the extrusion tip, the insert having an insert channel from the inlet end to the outlet end, wherein the insert channel aligns with the flow channel when the second end is positioned into the cavity of the extrusion tip through the top end such that the second end of the liquefier tube abuts the inlet end of the insert, the tip insert comprising surfaces that direct the flow of the molten feedstock through an extrusion port;
   feeding a feedstock into the first end of the liquefier tube;
   heating the feedstock in the liquefier tube proximate to the second end to a molten pool;
   extruding the molten feedstock through the extrusion port; and
   depositing the molten feedstock from the extrusion tip insert along a series of roads to print the part.

20. The method of claim 19, and wherein the insert is constructed from carbide.

* * * * *